United States Patent
Kim et al.

(10) Patent No.: US 11,807,070 B2
(45) Date of Patent: Nov. 7, 2023

(54) MOUNTING STRUCTURE OF THERMAL MANAGEMENT MODULE FOR VEHICLE

(71) Applicants: HYUNDAI MOTOR COMPANY, Seoul (KR); Kia Corporation, Seoul (KR); HANON SYSTEMS, Daejeon (KR)

(72) Inventors: Yeonho Kim, Seoul (KR); Jeawan Kim, Gwangmyeong-si (KR); Jae Yeon Kim, Hwaseong-si (KR); Jung Bum Choi, Daejeon (KR); Seong Woo Jeong, Daejeon (KR); In guk Hwang, Daejeon (KR)

(73) Assignees: HYUNDAI MOTOR COMPANY, Seoul (KR); KIA CORPORATION, Seoul (KR); HANON SYSTEMS, Daejeon (KR)

( * ) Notice: Subject to any disclaimer, the term of this patent is extended or adjusted under 35 U.S.C. 154(b) by 36 days.

(21) Appl. No.: 17/544,348

(22) Filed: Dec. 7, 2021

(65) Prior Publication Data
US 2022/0402328 A1 Dec. 22, 2022

(30) Foreign Application Priority Data
Jun. 21, 2021 (KR) .................. 10-2021-0080011

(51) Int. Cl.
*B60H 1/00* (2006.01)
(52) U.S. Cl.
CPC .................. *B60H 1/00535* (2013.01)
(58) Field of Classification Search
CPC ............ B60H 1/00535; B60H 1/00542; B60H 1/00521; B60H 2001/00214
See application file for complete search history.

(56) References Cited

U.S. PATENT DOCUMENTS

| 2017/0028810 A1* | 2/2017 | Feldhake | .................. B60P 3/20 |
| 2020/0376924 A1* | 12/2020 | Tezza, II | ................ B62D 25/20 |

FOREIGN PATENT DOCUMENTS

| CN | 106740031 A | * | 5/2017 | |
| WO | WO-2020109478 A1 | * | 6/2020 | ......... B60H 1/00535 |

OTHER PUBLICATIONS

WO-2020109478-A1 English Translation (Year: 2020).*
CN-106740031-A English Tranlstion (Year: 2017).*

* cited by examiner

*Primary Examiner* — David J Teitelbaum
(74) *Attorney, Agent, or Firm* — MORGAN, LEWIS & BOCKIUS LLP

(57) ABSTRACT

A mounting structure of a thermal management module for a vehicle according to an embodiment of the present disclosure includes: front side members extending along a length direction of a vehicle and disposed on left and right sides of the vehicle, respectively, in a width direction of the vehicle; a dash reinforcement crossmember extending along the width direction of the vehicle and coupled to rear ends of the front side members on the left and right sides based on a front and rear direction of the vehicle; a crossmember dividing a space formed by the front side members into two spaces in the front and rear direction of the vehicle; and at least one mounting bracket, on which the thermal management module is mounted, configured to mount the thermal management module in one of the two spaces divided by the crossmember.

11 Claims, 6 Drawing Sheets

MOUNTING STRUCTURE OF THERMAL MANAGEMENT MODULE FOR VEHICLE

CROSS-REFERENCE TO RELATED APPLICATION

This application claims the benefit of priority to Korean Patent Application No. 10-2021-0080011 filed on Jun. 21, 2021 in the Korean Intellectual Property Office, the entire contents of which are incorporated herein by reference.

TECHNICAL FIELD

The present disclosure relates to a mounting structure of a thermal management module for a vehicle. More particularly, the present disclosure relates to a mounting structure of a thermal management module for a vehicle for stably mounting a thermal management module while minimizing a mounting space in front of a vehicle body in a PBV (Purpose Built Vehicle).

BACKGROUND

Recently, the vehicle industry has introduced a new concept of future mobility visions for realizing a human-centered dynamic future city.

One of these future mobility solutions is a PBV (purpose-built vehicle) for purpose-based mobility.

The PBV is an environment-friendly mobility solution that provides customized services necessary for occupants during the time of moving to the destination on the ground, and it may also perform setting of an optimal path and cluster driving for each situation using electric vehicle-based and artificial intelligence.

In other words, the PBV vehicle is a means of transportation and a fixed facility in which case-related technologies are concentrated, and has an autonomous driving function so that a separate driver's seat is unnecessary. In addition, the indoor space has substantial expandability.

This PBV vehicle may be changed not only to a role of a shuttle that moves a plurality of people, but also to recreational spaces such as restaurants, cafes, hotels, and movie theaters, and socially essential facilities such as hospitals and pharmacies.

Here, the PBV vehicle is moved using an electric motor for power, and consists of a skateboard-type rolling chassis (also called an underbody or a skateboard in the industry) in which a battery is widely spread on the lower part, and an upper vehicle body that may accommodate an occupant.

The PBV vehicle configured in this way is equipped with an air conditioner for controlling the indoor temperature of the upper vehicle body, and a thermal management module that supplies a coolant or a refrigerant to the air conditioner, however, there is a problem that it is difficult to dispose each constituent element of the thermal management module in a narrow mounting space, and the layout of pipes through which the coolant or the refrigerant flows is complicated.

In addition, due to the limitation of the mounting space of the rolling chassis, the constituent elements of the thermal management module or the constituent elements of the air conditioner must be mounted on the upper vehicle body, and there is also a problem in that the internal space of the upper vehicle body is reduced.

In order to solve these problems, there is a need to develop a technology for mounting the thermal management module and the air conditioner on the rolling chassis.

The above information disclosed in this Background section is only for enhancement of understanding of the background of the disclosure, and therefore it may contain information that does not form the prior art that is already known in this country to a person of ordinary skill in the art.

SUMMARY

Therefore, the present disclosure is intended to solve the problem as described above, and the problem to be solved by the present disclosure is to provide a mounting structure of a thermal management module for a vehicle stably mounting the thermal management module while minimizing the mounting space in front of the vehicle body in the PBV (Purpose Built Vehicle).

A mounting structure of a thermal management module for a vehicle according to an embodiment of the present disclosure includes: front side members extending along a length direction of a vehicle and disposed on left and right sides of the vehicle in a width direction of the vehicle; a dash reinforcement crossmember extending along the width direction of the vehicle and coupled to rear ends of the front side members on the left and right sides based on a front and rear direction of the vehicle; a crossmember dividing a space formed by the front side members into spaces in the front and rear direction of the vehicle; and at least one mounting bracket, on which the thermal management module is mounted, configured to mount the thermal management module in one of the spaces divided by the crossmember.

The at least one mounting bracket may include a first mounting bracket and a second mounting bracket, each of which is configured to be detachably coupled to each other.

The first mounting bracket may include: a first body part having a rectangular box shape of which both sides in the width direction of the vehicle and an upper part of the first body part are opened; a first bent part bent toward the front and rear direction of the vehicle in the upper part of the first body part, respectively, and supported by the dash reinforcement crossmember and the crossmember; and a first coupling part extending from the first bent part in the width direction of the vehicle.

The second mounting bracket may include: a second body part having a rectangular box shape of which both sides in the width direction of the vehicle and an upper part are opened; a second bent part bent toward the front and rear direction of the vehicle in the upper part of the second body part, respectively, and supported by the dash reinforcement crossmember and the crossmember; and a second coupling part extending from the second bent part in the width direction of the vehicle.

The first coupling part may be connected to the first bent part through an inclined part obliquely extending from the first bent part toward the upper part of the second body part so that the second coupling part is positioned below the first coupling part.

The first coupling part may be coupled with an upper part of the second coupling part in a partially overlapping state.

The thermal management module may include: a coolant circulator mounted on one of the first mounting bracket or the second mounting bracket, through which a coolant is circulated inside by an operation of each constituent element; and a refrigerant circulator mounted on the other of the first mounting bracket or the second mounting brackets, through which a refrigerant is circulated inside by the operation of each constituent element.

The coolant circulator and the refrigerant circulator may be mounted on the first mounting bracket or the second mounting bracket before the first mounting bracket and the second mounting bracket are coupled to each other.

The coolant circulator may be configured inside a first housing, and includes a water pump, a reservoir tank, an electric heater, or at least one water valve that is connected through a coolant flow path block forming a flow passage of the coolant.

The refrigerant circulator may be configured inside a second housing, and includes a compressor, a condenser, an expansion valve, an evaporator, an accumulator, at least one refrigerant valve, or a chiller that is connected through a refrigerant flow path block forming a flow passage of the refrigerant.

The crossmember may be mounted by connecting both ends thereof to the front side members, respectively, in the width direction of the vehicle, and the both ends may be respectively coupled to inner surfaces of the front side members at positions spaced apart from the dash reinforcement crossmember toward the front of the vehicle at a predetermined interval.

Front portions of the front side members may be connected to each other by a bumper beam extending along the width direction of the vehicle along the length direction of the vehicle.

As described above, according to the mounting structure of the thermal management module for the vehicle according to an embodiment of the present disclosure, it is possible to stably mount the thermal management module while minimizing the mounting space in front of the vehicle body in the purpose built vehicle (PBV).

In addition, the present disclosure may minimize heat loss that may occur in the process of moving the coolant and the refrigerant by minimizing the use of pipes in which the coolant and the refrigerant are circulated in the coolant circulator and the refrigerant circulator included in the thermal management module.

In addition, by applying the thermal management module in which the coolant circulator and the refrigerant circulator are modularized, the layout may be simplified in the narrow vehicle front space, and mountability, assemblability, and maintainability may be improved.

In addition, the present disclosure may maximize the interior space of the vehicle that may be applied for various purposes by mounting the thermal management module to the vehicle body in the PBV (Purpose Built Vehicle).

DETAILED DESCRIPTION OF THE EMBODIMENTS

Figure 1:
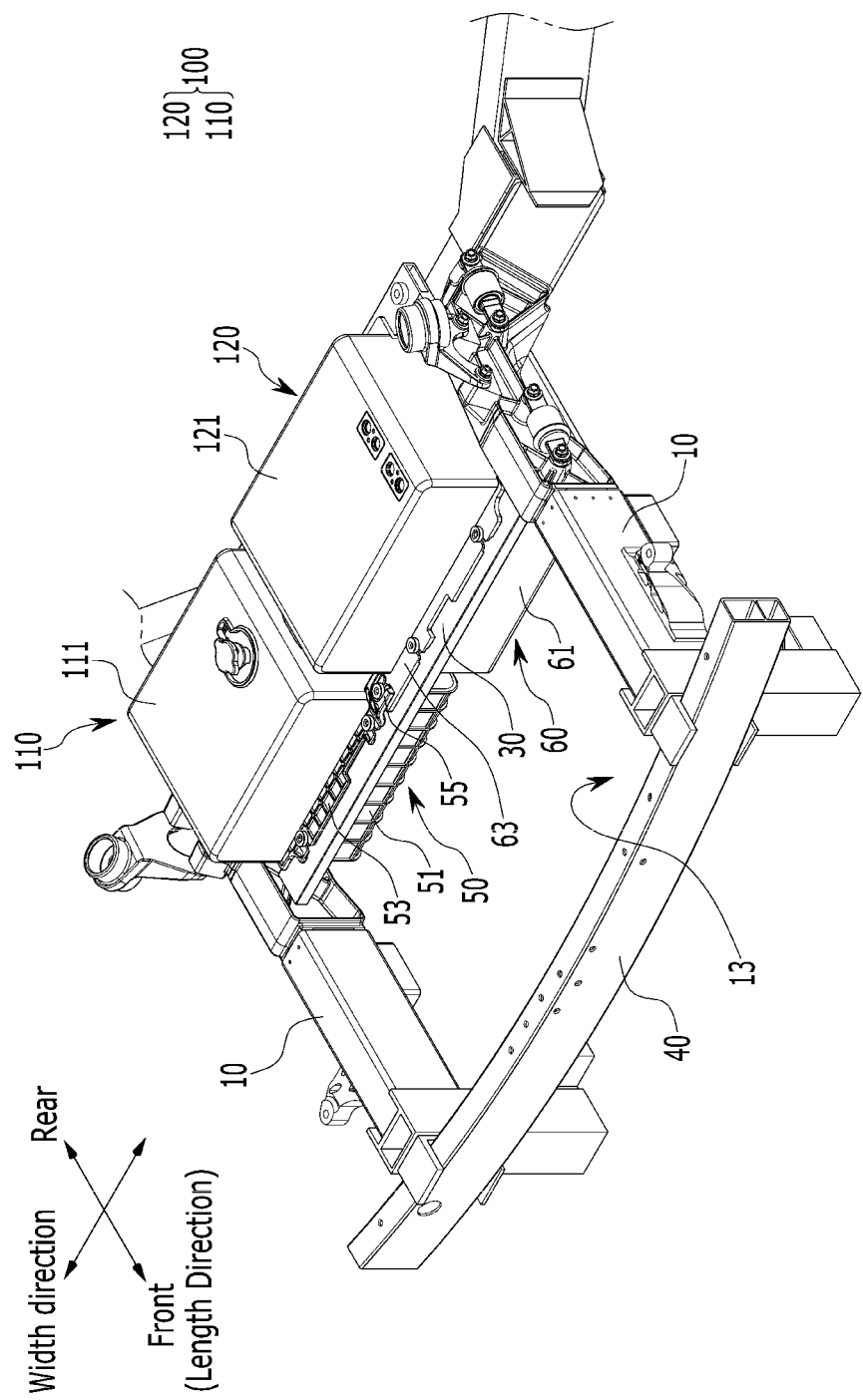
FIG. 1 is a perspective view of a mounting structure of a thermal management module for a vehicle according to an exemplary embodiment of the present disclosure.

An embodiment of the present disclosure will hereinafter be described in detail with reference to the accompanying drawings.

Exemplary embodiments described in the present specification and a configuration shown in the drawings are just the most preferable embodiment of the present disclosure, but are not limited to the spirit and scope of the present disclosure. Therefore, it should be understood that there may be various equivalents and modifications capable of replacing them at the time of filing of the present application.

In order to clarify the present disclosure, parts that are not connected with the description will be omitted, and the same elements or equivalents are referred to by the same reference numerals throughout the specification.

The size and thickness of each element are arbitrarily shown in the drawings, and the present disclosure is not necessarily limited thereto, and in the drawings, the thickness of layers, films, panels, regions, etc., are exaggerated for clarity.

Throughout this specification and the claims which follow, unless explicitly described to the contrary, the word "comprise" or variations such as "comprises" or "comprising" will be understood to imply the inclusion of stated elements but not the exclusion of any other elements.

Further, the terms, " . . . unit", " . . . mechanism", " . . . portion", " . . . member" etc. used herein mean a unit of inclusive components performing at least one or more functions or operations.

Figure 2:
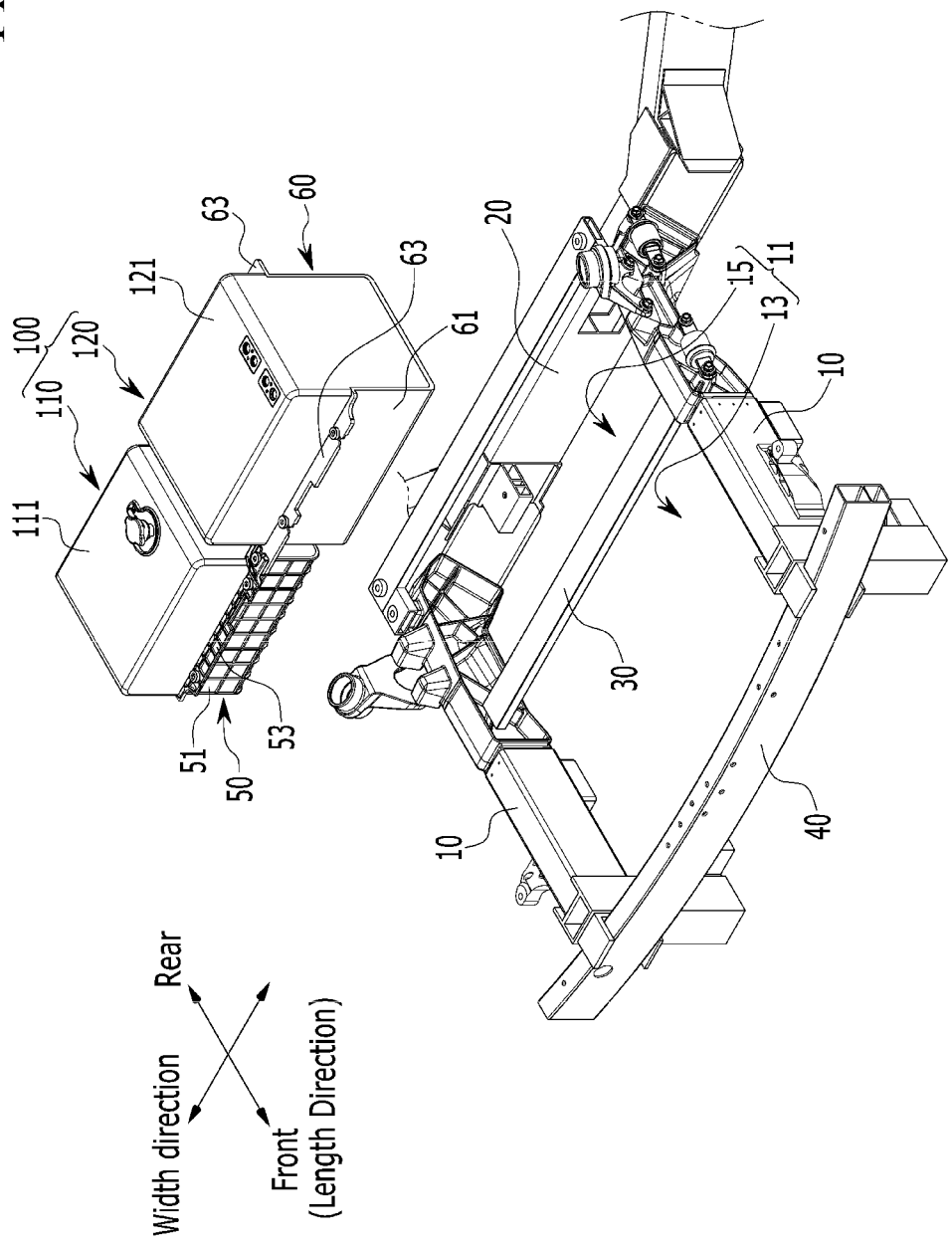
FIG. 2 is an exploded perspective view of a mounting structure of a thermal management module for a vehicle according to an exemplary embodiment of the present disclosure.
Figure 3:
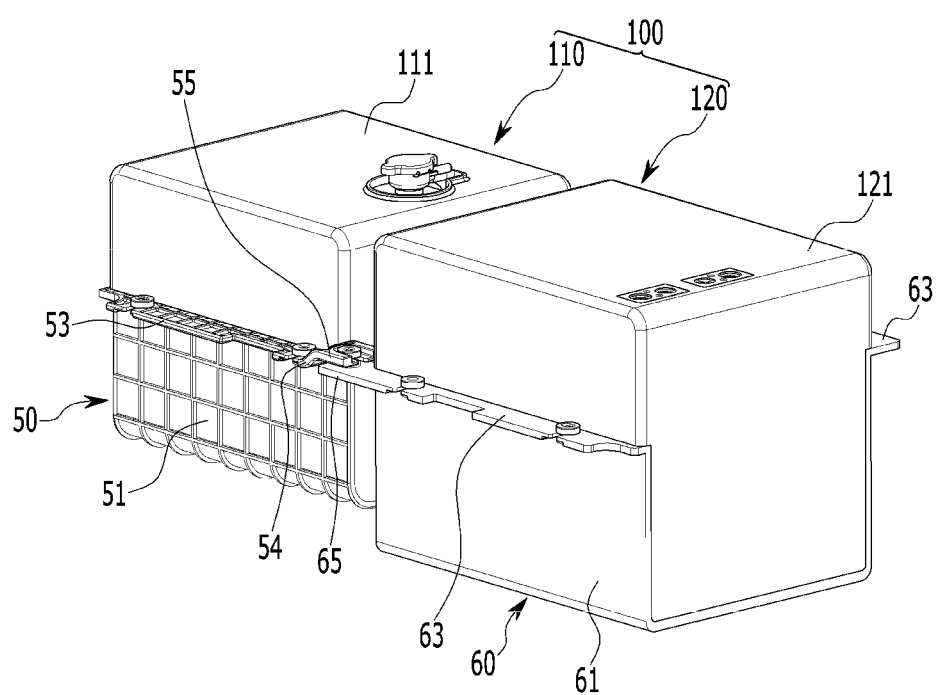
FIG. 3 is a perspective view showing a state that a thermal management module and a mounting bracket are coupled in a mounting structure of a thermal management module for a vehicle according to an exemplary embodiment of the present disclosure.
Figure 4:
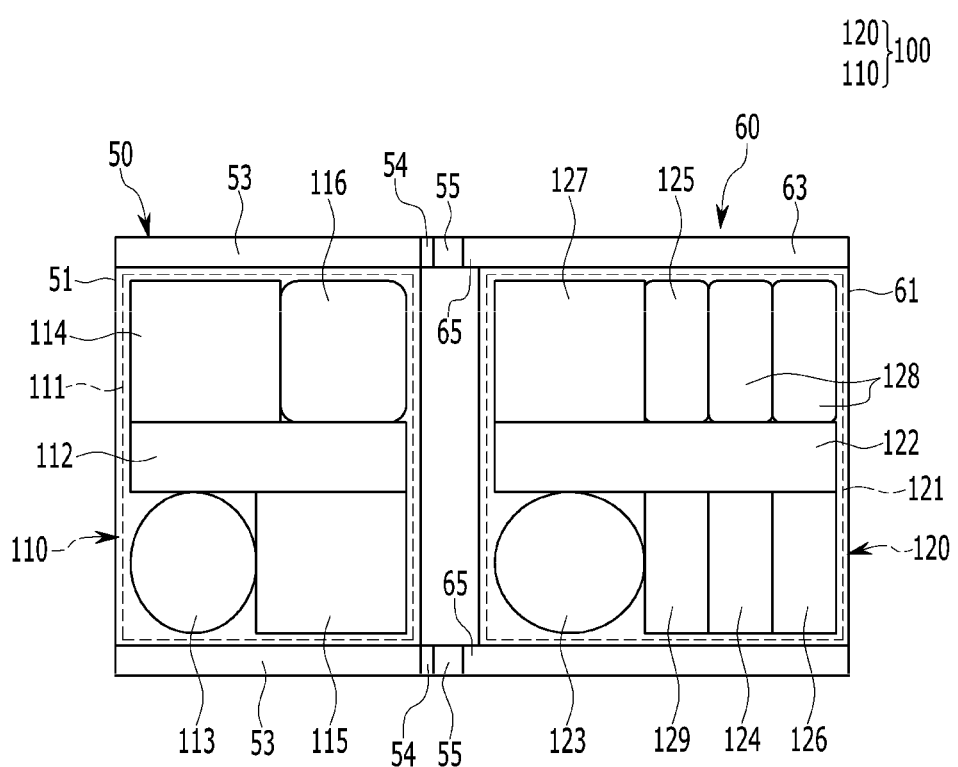
FIG. 4 is a schematic diagram for a constituent element of a thermal management module in a mounting structure of a thermal management module for a vehicle according to an exemplary embodiment of the present disclosure.
Figure 5:
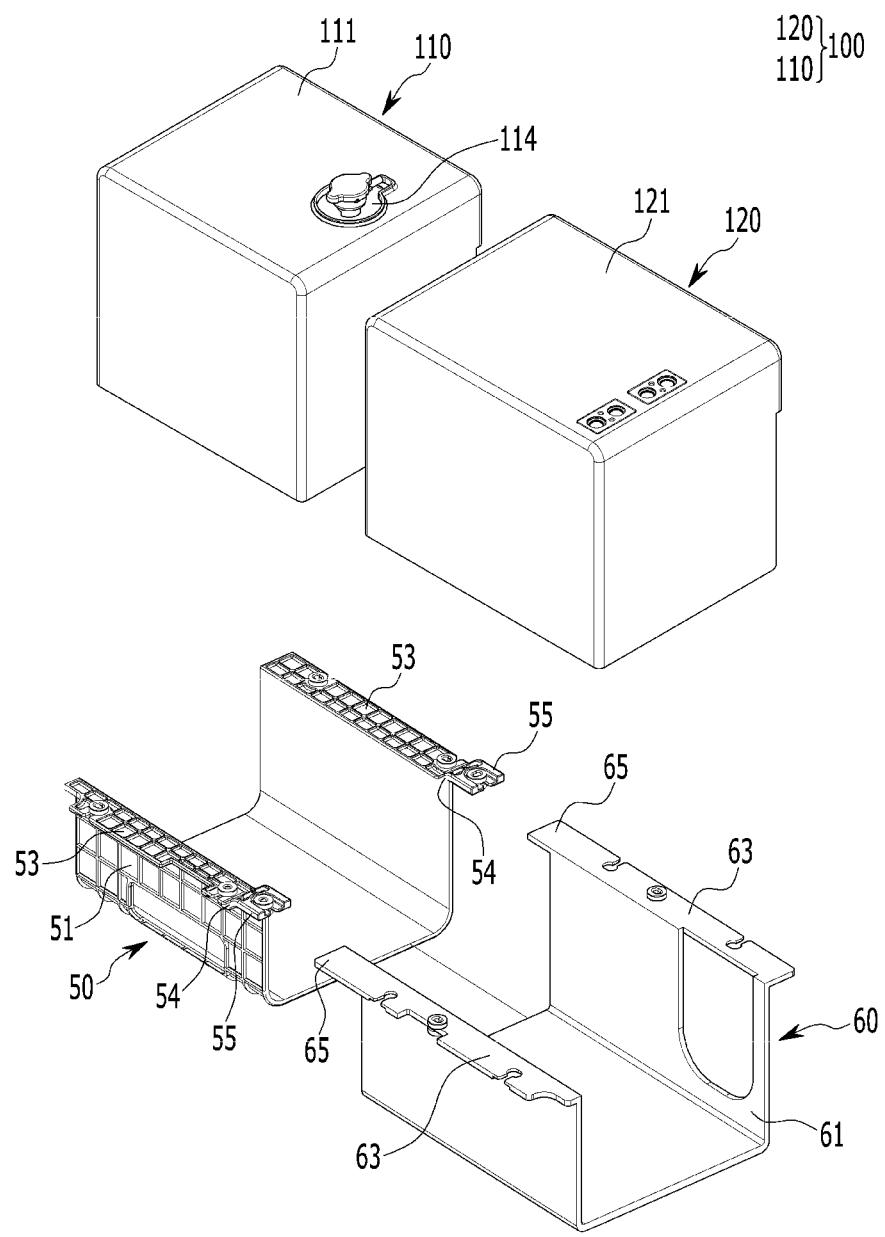
FIG. 5 is an exploded perspective view of a thermal management module and mounting brackets applied to a mounting structure of a thermal management module for a vehicle according to an exemplary embodiment of the present disclosure.
Figure 6:
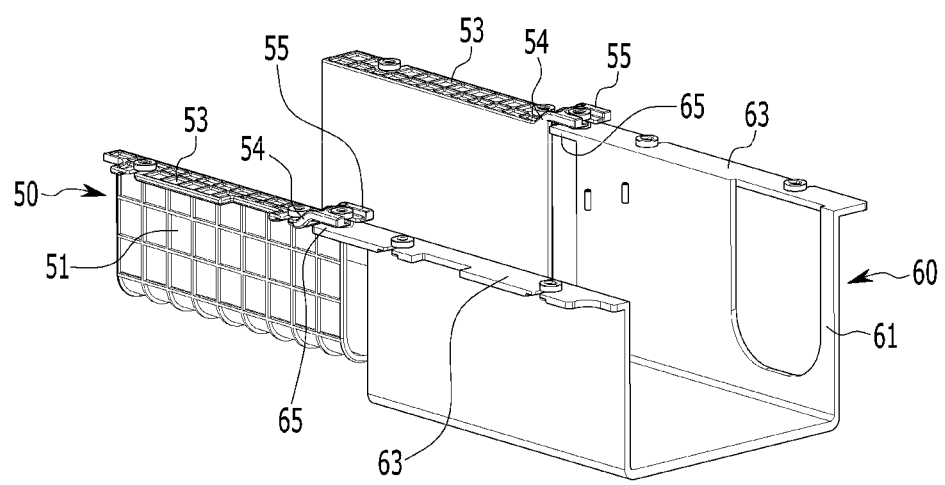
FIG. 6 is a perspective view showing a state in which mounting brackets applied to a mounting structure of a thermal management module for a vehicle according to an exemplary embodiment of the present disclosure are mutually assembled.

FIG. 1 is a perspective view of a mounting structure of a thermal management module for a vehicle according to an exemplary embodiment of the present disclosure, FIG. 2 is an exploded perspective view of a mounting structure of a thermal management module for a vehicle according to an exemplary embodiment of the present disclosure, FIG. 3 is a perspective view showing a state that a thermal management module and a mounting bracket are coupled in a mounting structure of a thermal management module for a vehicle according to an exemplary embodiment of the present disclosure, FIG. 4 is a schematic diagram for a constituent element of a thermal management module in a mounting structure of a thermal management module for a vehicle according to an exemplary embodiment of the present disclosure, FIG. 5 is an exploded perspective view of a thermal management module and mounting brackets applied to a mounting structure of a thermal management module for a vehicle according to an exemplary embodiment of the present disclosure, and FIG. 6 is a perspective view showing a state in which mounting brackets applied to a mounting structure of a thermal management module for a vehicle according to an exemplary embodiment of the present disclosure are mutually assembled.

An embodiment of the present disclosure may be applied to, for example, a purpose built vehicle (hereinafter referred to as a PBV).

The PBV is an electric vehicle-based environment-friendly mobile vehicle that provides customized services necessary to an occupant during a travel time to a destination on the ground.

The PBV is capable of setting an optimal path and cluster driving for each situation, and may further be a box-type design vehicle with a large indoor space.

Such a PBV vehicle includes a skateboard type of rolling chassis (also referred to as an under body in the art) and an upper body mounted on the rolling chassis.

The rolling chassis may be equipped with a battery assembly, and a drive motor (although not shown in the drawings) may be installed.

Referring to FIG. 1 and FIG. 2, the mounting structure of the thermal management module for the vehicle according to an exemplary embodiment of the present disclosure is for mounting a thermal management module 100 to the rolling chassis, and includes a front side member 10, a dash reinforcement crossmember 20, a crossmember 30, and at least one mounting bracket 50, 60.

First, the front side member 10 is disposed on the left and right sides respectively along the width direction of the vehicle and extends along the length direction of the vehicle.

The dash reinforcement crossmember 20 extends along the width direction of the vehicle and is coupled to the rear end of the front side member 10 on the left and right sides based on the front and rear direction of the vehicle.

Here, the front side members 10 may be connected to each other by a bumper beam 40 extending along the width direction of the vehicle in the front along the length direction of the vehicle.

That is, the front portions of the front side members 10 on the left and right sides along the length direction of the vehicle may be connected to each other by the bumper beam 40 extending along the width direction of the vehicle.

The rear portions of the front side member 10 may be connected to each other by the dash reinforcement crossmember 20 extending along the width direction of the vehicle.

Here, the front side member 10 may form a space 11 having a substantially rectangular shape by the dash reinforcement crossmember 20 and the bumper beam 40 coupled to the rear and the front of the front side member 10, respectively.

In the present embodiment, the crossmember 30 is mounted by connecting to each of the front side members 10 in the vehicle width direction, and may divide the space 11 formed by the side member 10, the dash reinforcement crossmember 20, and the bumper beam 40 into two spaces in the front and rear direction of the vehicle.

Here, both ends of the crossmember 30 may be coupled to the inner surface of the front side member 10 in the position spaced apart from the dash reinforcement crossmember 20 by a predetermined interval toward the front of the vehicle.

That is, the crossmember 30, as shown in FIG. 2, divides the space 11 into a front space 13 and a rear space 15 based on the vehicle's front and rear direction.

At least one mounting bracket may mount the thermal management module 100 so that the thermal management module 100 is mounted in the rear space 15 of the space 11 divided by the crossmember 30.

Here, the at least one mounting bracket, as shown in FIG. 3 to FIG. 6, may include first and second mounting brackets 50 and 60, each of which is configured to be detachably coupled to each other.

The first mounting bracket 50 may include a first body part 51, a first bent part 53, and a first coupling part 55.

First, the first body part 51 may have a rectangular box shape with both sides and the upper part opened in the width direction of the vehicle.

The first bent part 53 may be bent toward the front and rear direction of the vehicle from the upper part of the first body part, respectively.

This first bent part 53 may be supported by the upper part of the dash reinforcement crossmember 20 and the crossmember 30. Here, the first bent part 53 may be fixed through, for example, bolt engagement, etc. in a state of being supported by the dash reinforcement crossmember 20 and the crossmember 30.

The first coupling part 55 may extend from the first bent part 53 in one direction with respect to the width direction of the vehicle. This first coupling part 55 may be detachably assembled to the second mounting bracket 60.

In the present embodiment, the second mounting bracket 60 includes a second body part 61, a second bent part 63, and a second coupling part 65.

First, the second body part 61 may have a rectangular box shape in which both sides and the upper part are opened in the width direction of the vehicle.

The second bent part 63 is bent toward the front and rear direction of the vehicle from the upper part of the second body part 61, respectively.

This second bent part 63 may be supported by the upper part of the dash reinforcement crossmember 20 and the crossmember 30. Here, the second bent part 63 may be fixed through, for example, bolt engagement, etc. in a state of being supported by the dash reinforcement crossmember 20 and the crossmember 30.

The second coupling part 65 may extend from the second bent part 63 toward one direction with respect to the width direction of the vehicle.

That is, the first coupling part 55 and the second coupling part 65 extend from the first bent part 53 and the second bent part 63, respectively, toward directions facing each other.

This second coupling part 65 may be detachably assembled to the first coupling part 55 of the first mounting bracket 50.

Here, the first coupling part 55 may be connected to the first bent part 53 through an inclined part 54 that inclinedly extends from the first bent part 53 toward the upper part of the second body part 61 so that the second coupling part 65 is positioned at the lower part than the first coupling part 55.

Accordingly, the first coupling parts 55 may be coupled to each other through, for example, bolt engagement, etc. in a partially overlapping state on the upper part of the second coupling part 65.

On the other hand, in the present embodiment, the first and second mounting brackets 50 and 60 are described as being assembled together, but it is not limited thereto, and in a state that they are not assembled according to the size or shape of the space 11, and they may be mounted on the front side member 10, the dash reinforcement crossmember 20, the crossmember 30, etc.

In the present embodiment, the thermal management module 100, as shown in FIG. 4, may include a coolant circulator 110 and a refrigerant circulator 120.

First, the coolant circulator 110 may be mounted on one of the first mounting bracket 50 and the second mounting bracket 60 so that the coolant circulates inside by the operation of each constituent element.

In the present embodiment, the coolant circulator 110 is mounted on the first mounting bracket 50.

Here, the coolant circulator 110 is configured inside a first housing 111, and may include a water pump 113, a reservoir tank 114, an electric heater 115, or at least one water valve 116 that are connected through a coolant flow path block 112 forming a flow passage of the coolant.

The water pump 113, the reservoir tank 114, the electric heater 115, or at least one water valve 116 may be smoothly mounted through the coolant flow path block 112 in which the coolant flow path is formed.

In addition, the coolant circulator 110 may minimize the use of piping by applying the coolant flow path block 112, and each constituent element of the coolant circulator 110 may be compactly disposed inside the first housing 111.

The refrigerant circulator 120 may be mounted on the other one of the first mounting bracket 50 or the second mounting bracket 60 so that the refrigerant circulates therein by the operation of each constituent element.

In the present embodiment, the refrigerant circulator 120 may be mounted to the second mounting bracket 60.

The refrigerant circulator 120 is configured inside a second housing 121, and may include a compressor 123, a condenser 124, an expansion valve 125, an evaporator 126, an accumulator 127, at least one refrigerant valve 128, or a chiller 129 which are connected through a refrigerant flow path block 122 forming the flow passage of the refrigerant.

The compressor 123, the condenser 124, the expansion valve 125, the evaporator 126, the accumulator 127, at least one refrigerant valve 128, or the chiller 129 may be mounted smoothly though the refrigerant flow path block 122 inside of which the refrigerant flow path is formed.

In addition, the refrigerant circulator 120 may minimize the use of piping by applying the refrigerant flow path block 122, and each constituent element of the refrigerant circulator 120 may be compactly disposed inside the second housing 121.

The coolant circulator 110 and the refrigerant circulator 120 configured in this way may be mounted on the first mounting bracket 50 or the second mounting bracket 60, respectively, without the first mounting bracket 50 and the second mounting bracket 60 being coupled together.

In addition, since the coolant circulator 110 and the refrigerant circulator 120 are disposed to the adjacent positions, the coolant may be smoothly supplied to the constituent element that heat-exchanges the refrigerant in a water-cooled manner using the coolant in the refrigerant circulator 120.

On the other hand, in the present embodiment, it is described that the coolant circulator 110 is mounted to the first mounting bracket 50 and the refrigerant circulator 120 is mounted to the second mounting bracket 60 as an exemplary embodiment, however it is not limited to this, and it may be applied by changing a position of a non-illustrated air conditioner or the mounting bracket used according to a design condition.

Therefore, according to the mounting structure of the thermal management module for the vehicle according to an exemplary embodiment of the present disclosure configured as described above, the thermal management module 100 may be stably mounted while minimizing the mounting space in front of the vehicle body in the PBV (Purpose Built Vehicle).

In addition, the present disclosure minimizes the use of the pipes in which the coolant and refrigerant are circulated in the coolant circulator 110 and the refrigerant circulator 120 included in the thermal management module 100, thereby minimizing heat loss that may occur in the process of moving the coolant and refrigerant.

In addition, by applying the thermal management module 100 in which the coolant circulator 110 and the refrigerant circulator 120 are modularized, the layout may be simplified in the narrow front space of the vehicle, and mountability, assemblability, and maintainability may be improved.

In addition, the present disclosure may maximize the interior space of the vehicle that may be applied for various purposes by mounting the thermal management module 100 to the vehicle body in the PBV (Purpose Built Vehicle).

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS

10: front side member
20: dash reinforcement crossmember
30: crossmember
40: bumper beam
50: first mounting bracket
51: first body part
53: first bent part
54: the inclined part
55: first coupling part
60: second mounting bracket
61: second body part
63: second bent part
65: second coupling part
100: thermal management module
110: coolant circulator
120: refrigerant circulator

What is claimed is:

1. A mounting structure of a thermal management module for a vehicle, comprising:
    front side members extending along a length direction of a vehicle and disposed on left and right sides of the vehicle, respectively, in a width direction of the vehicle;
    a dash reinforcement crossmember extending along the width direction of the vehicle and coupled to rear ends of the front side members on the left and right sides based on a front and rear direction of the vehicle;
    a crossmember dividing a space formed by the front side members into spaces in the front and rear direction of the vehicle; and
    at least one mounting bracket, on which the thermal management module is mounted, configured to mount the thermal management module in one of the spaces divided by the crossmember,
    wherein the at least one mounting bracket includes a first mounting bracket and a second mounting bracket, each of which is configured to be detachably coupled to each other.

2. The mounting structure of the thermal management module for the vehicle of claim 1, wherein
    the first mounting bracket includes:
    a first body part having a rectangular box shape of which both sides in the width direction of the vehicle and an upper part of the first body part are opened;
    a first bent part bent toward the front and rear direction of the vehicle in the upper part of the first body part, respectively, and supported by the dash reinforcement crossmember and the crossmember; and a first coupling part extending from the first bent part in the width direction of the vehicle.

3. The mounting structure of the thermal management module for the vehicle of claim 2, wherein
the second mounting bracket includes:
a second body part having a rectangular box shape of which both sides in the width direction of the vehicle and an upper part of the second body part are opened;
a second bent part bent toward the front and rear direction of the vehicle in the upper part of the second body part, respectively, and supported by the dash reinforcement crossmember and the crossmember; and
a second coupling part extending from the second bent part in the width direction of the vehicle.

4. The mounting structure of the thermal management module for the vehicle of claim 3, wherein
the first coupling part is connected to the first bent part through an inclined part obliquely extending from the first bent part toward the upper part of the second body part so that the second coupling part is positioned below the first coupling part.

5. The mounting structure of the thermal management module for the vehicle of claim 3, wherein
the first coupling part is coupled with an upper part of the second coupling part in a partially overlapping state.

6. The mounting structure of the thermal management module for the vehicle of claim 1, wherein
the thermal management module includes:
a coolant circulator mounted on one of the first mounting bracket or the second mounting bracket, through which a coolant is circulated inside by an operation of each constituent element; and
a refrigerant circulator mounted on the other of the first mounting bracket or the second mounting brackets, through which a refrigerant is circulated inside by the operation of each constituent element.

7. The mounting structure of the thermal management module for the vehicle of claim 6, wherein
the coolant circulator and the refrigerant circulator are mounted on the first mounting bracket or the second mounting bracket before the first mounting bracket and the second mounting bracket are coupled to each other.

8. The mounting structure of the thermal management module for the vehicle of claim 6, wherein
the coolant circulator is configured inside a first housing and includes a water pump, a reservoir tank, an electric heater, or at least one water valve that is connected through a coolant flow path block forming a flow passage of the coolant.

9. The mounting structure of the thermal management module for the vehicle of claim 6, wherein
the refrigerant circulator is configured inside a second housing and includes a compressor, a condenser, an expansion valve, an evaporator, an accumulator, at least one refrigerant valve, or a chiller that is connected through a refrigerant flow path block forming a flow passage of the refrigerant.

10. The mounting structure of the thermal management module for the vehicle of claim 1, wherein
the crossmember is mounted by connecting both ends thereof to the front side members, respectively, in the width direction of the vehicle, and the both ends are respectively coupled to inner surfaces of the front side members at positions spaced apart from the dash reinforcement crossmember toward the front of the vehicle at a predetermined interval.

11. The mounting structure of the thermal management module for the vehicle of claim 1, wherein
front portions of the front side members are connected to each other by a bumper beam extending along the width direction of the vehicle along the length direction of the vehicle.

* * * * *